Aug. 11, 1936.　　　K. RÄNTSCH　　　2,050,860
APPARATUS FOR PROJECTING IMAGES ON LENTICULATED FILMS
Filed July 12, 1932
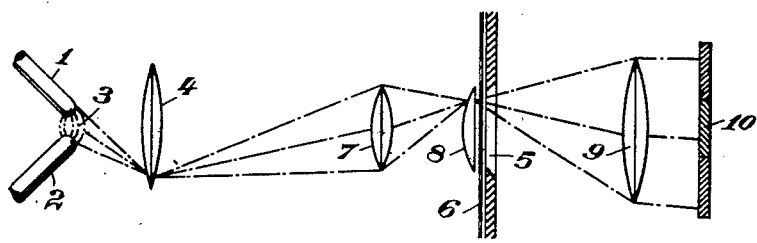
INVENTOR
Kurt Räntsch
BY Gifford, Scull & Burgess
ATTORNEYS

Patented Aug. 11, 1936

2,050,860

UNITED STATES PATENT OFFICE 2,050,860

APPARATUS FOR PROJECTING IMAGES ON LENTICULATED FILMS

Kurt Räntsch, Teltow-Seehof, near Berlin, Germany, assignor to Siemens & Halske, Aktiengesellschaft, Siemensstadt, near Berlin, Germany, a corporation of Germany Application July 12, 1932, Serial No. 622,041
In Germany July 16, 1931

1 Claim. (Cl. 88—16.4)

This invention relates to novel and improved optical projection systems, particularly such systems as are adapted for use with lenticulated films.

As is well known in the art, in projection systems the source of light projects a beam of light through the film and through a color filter associated therewith. According to my invention, the optical system is so designed that the images of the light source and of the condenser associated therewith are projected, one into the plane of the film and the other into the plane of the filter, or so that this effect is obtained. In some instances, more particularly where the lenticulated or goffered surface of the film is turned toward the light source, the filter may be incorporated in the condenser.

In the accompanying drawing, I have shown a selected embodiment of the invention in the sole figure, in which the source of light is formed by an arc 3, burning between the carbon electrodes 1 and 2. In front of it, there is the condenser 4. The film gate 5 of a projection apparatus, before which the film 6 is passed, is to be illuminated. In order uniformly to illuminate the film gate the lens 7 is so arranged as to project an image of the condenser lens 4 in the film gate or at least in the neighbourhood thereof.

The lens 7 is arranged in such a manner that it lies in the neighbourhood of the image of the arc 3 projected by the condenser lens 4. This has also the advantage that, at this point, the beam of rays is most restricted, so that the lens 7 need have only a small diameter to cover the whole beam of light. In order that the rays should pass through the film substantially normal thereto, a collimating lens 8 may be placed before the film gate.

For the case mentioned as example, if the lens 7 is arranged in the image of the crater 3, the focal distance of the collimating lens should be equal to the distance between lens 7 and lens 8.

The light, after passing through the emulsion 6, at the film gate, passes through an objective indicated by the lens 9 and then through the color filter 10 to the projection screen (not shown).

In the projection system shown, the film is preferably arranged with the lenticulations thereon facing away from the light source, and the system is so designed and arranged that the image of the light source is reproduced substantially in the plane of the color filter, whereas the image of the condenser 4 is reproduced substantially in the film gate or, in other words, approximately in the plane of the film.

For illustration purposes, three rays of the light beam have been drawn, of which the one in the middle passes through the vertical border portion of the film. The refraction in the film itself is not shown. In this case all the portions of the image are radiated at the same angle.

In projection devices for ordinary films (black-white-films) the light-source or even the condenser has been reproduced in the film gate, whereby an image of the light-source is produced in the neighbourhood of the objective.

Such devices are, however, unfit for the projection of lenticulated films used to project colored pictures since all the cones of light, having their apices in the film gate and their bases in the multicolor screen, must be equal both with respect to the size and form of the basic area and to the intensities occurring in the different directions if color falsifications (dominants) are to be avoided.

The equality of the cones is therefore a congruency, if the filter image, viewed from the film gate, lies in infinity, whereas in other cases the parallaxes must be taken into account.

In order to avoid color falsifications, on projecting lenticulated films, attention has up to now solely been paid to the projection of an image of an uniformly illuminated area in the color filter. Such a device has, for instance, been described in the French patent application No. 648,986. Such projection devices, however, are not capable of avoiding dominants completely, more particularly if the projection in large rooms is involved. The reason is that these devices do not fulfil the condition to be imposed on the passage of the beam of rays through the film gate.

When applying a projection device according to the present invention it is possible to obtain a faithful color reproduction for all portions of the image, in an entirely uniform manner. The principle underlying the invention is thereby, to make two demands on the optical illumination system. These two conditions are that the light-source and the condenser are to be imaged simultaneously in the planes of the film and the color filter, a special advantage being obtained on imaging the condenser into the film gate and the light source into the multicolor screen.

The latter device has the advantage that one succeeds more easily in obtaining an entirely homogeneous illumination of a condenser than in constructing a light source having an area brightness which is homogeneous throughout.

For the projection of lenticulated films use has up to now not been made of illumination devices with intermediate reproduction, as it was considered sufficient to illuminate the color filter uniformly. This invention shows that a suitable dimensioning of the lenses constituting the projecting optical system (in case of need mirrors) permits one to fulfil the conditions mentioned above and thus largely to avoid the drawbacks observed up to now in the projection of lenticulated films. On account of the unavoidable slight heterogeneousness of the source of light, it is thereby sufficient to project its image in the neighbourhood of one of the planes mentioned above. In the illustrated embodiment, for instance, the image of the source of light projected by the lenses 8 and 9 may lie immediately before or behind the color filter without materially detracting from the advantages inherent in the new devices.

A further improvement, when projecting films embossed with cylindrical lenses, consists in making the cones of light, having their apices in the film-gate, rectangularly shaped.

While I have shown the invention as embodied in a specific form, it is to be understood that various changes in details may be made without departing from the scope of the invention as defined by the appended claim.

I claim:

A projection system comprising a light source, a film gate having a lenticulated film therein with the lenticulated side of the film facing away from said light source, a condenser adapted to project light from said source through the film in said gate, an objective disposed in front of said gate, a color filter adjacent said objective and through which and the objective said light also passes, and means giving the optical effect of producing an image of said light source substantially in the plane of said filter and of producing an image of said condenser substantially in the plane of said film gate.

KURT RÄNTSCH.